April 29, 1941.   K. A. CRANK ET AL   2,240,387
SURGICAL KNIFE
Filed April 21, 1939
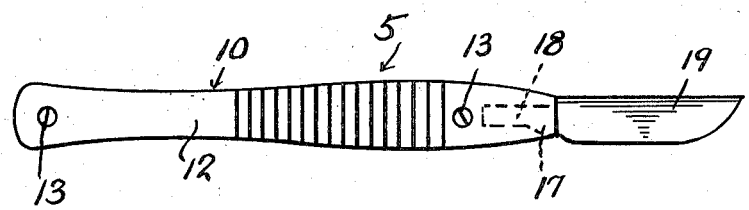
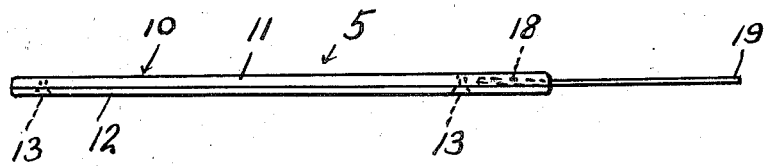
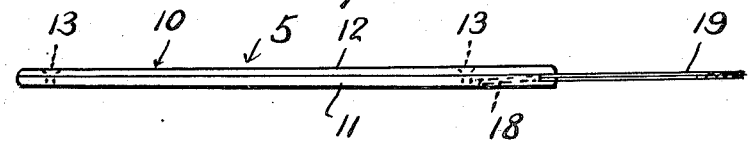
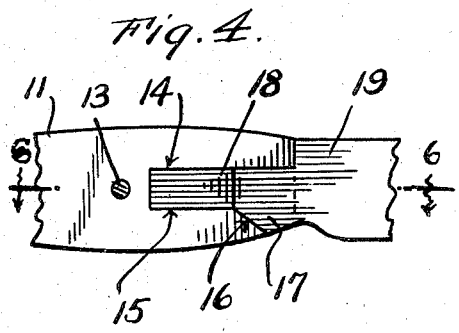
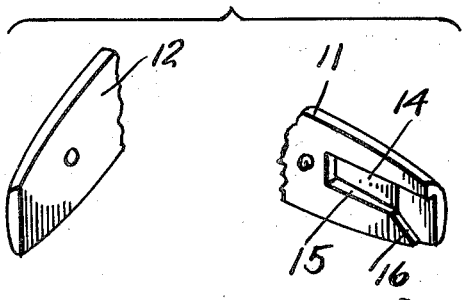
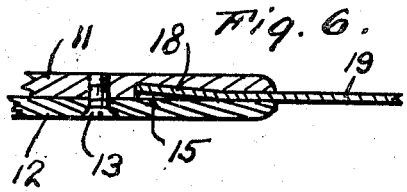
Inventors
Kenneth A. Crank
Alexander C. Crank
By L. B. James
Attorney Patented Apr. 29, 1941

2,240,387

UNITED STATES PATENT OFFICE 2,240,387

SURGICAL KNIFE

Kenneth A. Crank, Flint, Mich., and Alexander C. Crank, Clatskanie, Oreg.

Application April 21, 1939, Serial No. 269,200

1 Claim. (Cl. 30—340)

This invention relates to surgical instruments and more particularly surgical knives.

The primary objects of this invention resides in the provision of a knife having a plurality of different styles of detachable blades for use by surgeons, dentists, morticians and veterinarians.

Another object of this invention resides in the provision of a knife having a particularly constructed handle adapted to permit any one of a set of particularly constructed blades to be safely attached or removed therefrom in a simple and easy manner.

With these and other objects in view, this invention resides in certain novel features of construction and arrangement of elements to be hereinafter more fully set forth in the specification, illustrated in the accompanying drawing and pointed out in the appended claim and, while this disclosure depicts our present conception of the invention, the right is reserved to resort to such changes in construction and arrangement of parts as come within the scope of the claim.

In the accompanying drawing forming a part of this application:

Figure 1 is a side view of a surgical knife as constructed in accordance with this invention.

Figure 2 is a plan view thereof.

Figure 3 is a bottom plan view thereof.

Figure 4 is an enlarged sectional view approximately on line 4—4 of Figure 2.

Figure 5 is a perspective view of the forward portions of the handle members in juxtaposition.

Figure 6 is an enlarged cross sectional view of the forward end of the knife taken approximately on line 6—6 of Figure 4.

In the present illustration of this invention the numeral 5 designates, in general, a surgical knife which consists of a suitably shaped handle 10 composed of companion members 11 and 12 secured together by screws 13 or other suitable means.

The handle has a slot 14 opening through its forward wall. One side wall of this slot forms a plane surface and the other side wall has its forward portion parallel to the first wall and its remaining portion diverging rearwardly from the first side wall. This slot has narrow edge walls the upper of which forms a plane surface and the other and lower of which has its rear portion 15 parallel to the first edge wall and its forward portion 16 inclined forwardly away from the upper edge wall and terminating in spaced relation to the front end of the handle whereby the slot also opens through a side of the handle.

The blade 19 has a shank 18 bent out of the plane of the blade and provided with a lug 17 on its lower edge, the shank conforming in shape to said slot and having its rear portion inclined to frictionally engage the rear portion of said slot.

Although but one type of knife blade is herein disclosed and the handle is shown as comprising companion plates secured together, it is to be understood knives having cutting edges of other configurations are to be used with a handle constructed as aforesaid or one formed from a single piece of material having its knife receiving end similarly constructed.

With this invention fully described it is manifest a surgical knife is provided which readily meets the purposes of its adoption and, through the simplicity of its construction, it can be manufactured and marketed at a reasonable price.

Having thus described our invention, what we claim and desire to protect by Letters Patent is:

A knife having a detachable blade and comprising a handle having a slot opening through its forward end, said slot having side walls one of which forms a plane surface and the other of which has its forward portion parallel to the said plane surface and its remaining portion diverging rearwardly from said plane surface, said slot having narrow edge walls connecting said side walls, one of said edge walls forming a plane surface and the other of said edge walls having its rear portion parallel to the first edge wall and its forward portion inclined forwardly away from said first edge wall and terminating in spaced relation to the front end of the handle whereby the opening of the slot also extends through a side of the handle, and a knife blade having a shank offset from the back of the blade and of uniform thickness throughout, said shank having the portion adjacent the blade conforming in shape to the forward portion of the slot and having the portion remote from the blade inclined to frictionally engage the inclined side wall of the slot.

KENNETH A. CRANK.
ALEXANDER C. CRANK.